(12) United States Patent
Tsang

(10) Patent No.: US 6,733,379 B2
(45) Date of Patent: May 11, 2004

(54) POST-EVISCERATION PROCESS AND APPARATUS

(75) Inventor: Heng Y. Tsang, North Brunswick, NJ (US)

(73) Assignee: Rhodia Inc., Cranbury, NJ (US)

( * ) Notice: Subject to any disclaimer, the term of this patent is extended or adjusted under 35 U.S.C. 154(b) by 78 days.

(21) Appl. No.: 10/064,405

(22) Filed: Jul. 10, 2002

(65) Prior Publication Data

US 2004/0009745 A1 Jan. 15, 2004

(51) Int. Cl.⁷ .............................................. A22C 21/00
(52) U.S. Cl. ....................................................... 452/173
(58) Field of Search .............................. 452/81, 88–90, 452/94, 95, 114, 119, 120, 123; 15/3.12–3.14, 3.16, 3.17; 134/64 R, 122 R, 199, 131, 133

(56) References Cited

U.S. PATENT DOCUMENTS

| | | | | |
|---|---|---|---|---|
| 2,469,953 A | * | 5/1949 | Davis | 452/90 |
| 2,557,335 A | * | 6/1951 | Barker | 452/52 |
| 2,560,524 A | * | 7/1951 | Johnson | 452/179 |
| 2,821,741 A | * | 2/1958 | Dolah et al. | 452/90 |
| 2,908,033 A | * | 10/1959 | Zebarth | 452/89 |
| 4,282,632 A | * | 8/1981 | Conaway | 452/90 |
| 4,338,958 A | * | 7/1982 | Fujita | 118/326 |
| 5,069,922 A | | 12/1991 | Brotsky et al. | 426/332 |
| 5,484,332 A | | 1/1996 | Leech et al. | 452/173 |
| 5,605,503 A | * | 2/1997 | Martin | 452/173 |
| 5,755,246 A | * | 5/1998 | Carl et al. | 134/131 |
| 5,853,320 A | * | 12/1998 | Wathes et al. | 452/88 |
| 5,860,361 A | * | 1/1999 | Nanjyo et al. | 101/424 |
| 5,879,732 A | * | 3/1999 | Caracciolo et al. | 426/231 |
| 5,882,253 A | * | 3/1999 | Mostoller | 452/173 |
| 6,063,335 A | * | 5/2000 | Pirolo et al. | 422/28 |
| 6,146,263 A | | 11/2000 | Mostoller et al. | 452/173 |
| 6,176,772 B1 | * | 1/2001 | Hazenbroek et al. | 452/117 |

* cited by examiner

Primary Examiner—Thomas Price

(57) ABSTRACT

A process and apparatus for removing or reducing the levels of pathogenic bacteria present on an eviscerated carcass. The process includes introducing the eviscerated carcass to a cleaning apparatus. The cleaning apparatus generally includes a housing structure having an entrance and an exit. Disposed within the housing structure is a rotating brush assembly and a spray assembly. The brushing assembly provides brushing and massaging actions to the surfaces of the carcass whereas the spraying assembly simultaneously directs a cleaning solution onto the surfaces of the carcass.

16 Claims, 3 Drawing Sheets

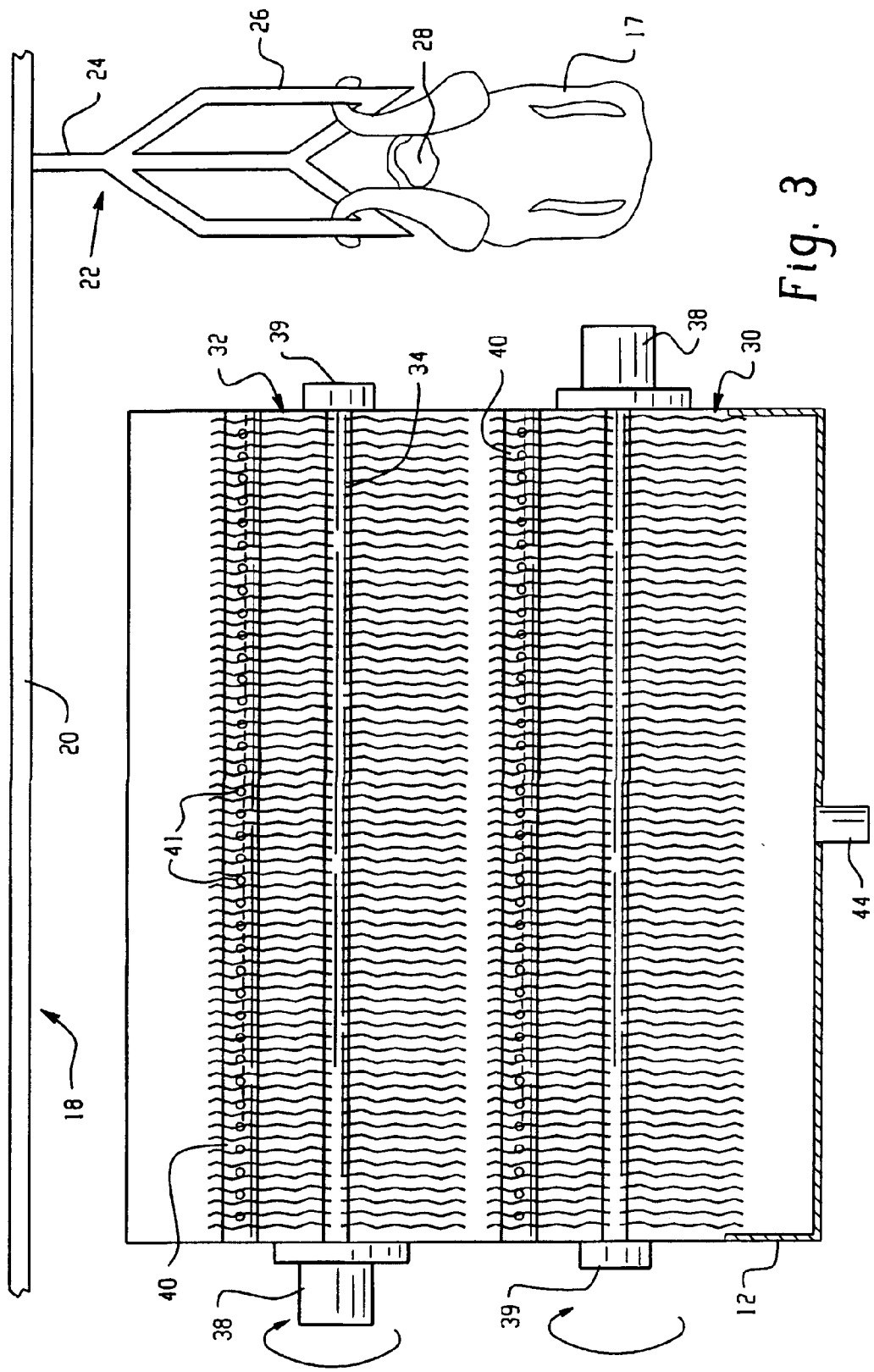

POST-EVISCERATION PROCESS AND APPARATUS

BACKGROUND OF INVENTION

This disclosure generally relates to a process for treating meat and poultry carcasses with an anti-microbial agent to remove pathogens.

Modern processing operations for preparing chicken, beef, pork, veal, turkey, duck, or other meats typically include an automated system that generally comprises slaughtering, bleeding, scalding, evisceration, cleaning, chilling, and packaging steps. Each step requires careful control of contamination to prevent cross-contamination, prevent spoilage, and possibly illness from subsequent consumption. Due to its very nature, the process of evisceration exposes the exterior body surfaces and inner body cavities of the animals or birds to the contents of digestive and intestinal tracts. As a result, the evisceration process can cause excrement, blood clots, or other pathogen-laden particulate matter to deposit and become attached to the carcass, and in particular, to surface fat layers, tissue, and feather or hair follicles. Consequently, immediately after the evisceration step, levels of bacteria and other pathogens on the surface of the carcass typically increase relative to pre-evisceration levels.

Several methods have been developed, with some regulated into use, to reduce the overall contamination rate after evisceration. Among these are co-current and counter-current chill tank systems and the addition of various processing aids to these tanks. Sonification may be also employed in the chill tank at sonic or ultrasonic frequencies. Generally accepted methodologies utilize mechanical paddles or spirals to submerge and move the carcass through the chill tank.

Other methods include mechanically spraying the carcass with water or a treatment solution under high pressure to Insure good contact. For example, one such process includes spraying a trialkyl metal orthophosphate solution onto the carcass at about 5 to about 150 psi. Additional methods include contacting the eviscerated carcass with a treatment solution in a rotating drum or immersion in a drag-through dip tank.

While these methods provide adequate cleaning of the carcass and reduce the body temperature to prolong the product's freshness and shelf life, the current processes are not particularly effective at reducing pathogens, especially when the carcass has relatively high levels of pathogens, such as can be the case after evisceration. Moreover, current methods fail to penetrate the hair or feather follicles of the animal or bird carcass, wherein the pathogens can reside and further contaminate the carcass tissue. While most bacteria and other pathogens still present on the carcass can be easily killed by heat, such as during cooking, colony-forming units (CFU) of bacteria can attach and/or reside in the regular and irregular surfaces of the carcass skin. These bacteria can then multiply and, thereafter, contaminate working surfaces, hands, utensils or whatever surface the processed meat or poultry contacts. Food spoilage and illness can result from this carry over of bacteria or cross-contamination from the infected carcass to surfaces not heated sufficiently to cause thermal destruction of the bacteria. Thus, removal of pathogens and other bacteria sources during processing is desired and there remains a need in the art for improved methodologies for effectively removing or reducing the levels of pathogens after evisceration.

SUMMARY OF INVENTION

Disclosed herein is an apparatus and process for cleaning an eviscerated carcass. The apparatus comprises a housing structure comprising an entrance and an exit; a conveyor for conveying the eviscerated carcass through the housing structure; a cleaning solution supply in fluid communication with a tubular member mounted within the housing structure, wherein each tubular member has a plurality of outlet orifices for spraying the cleaning solution onto the exterior surfaces of the eviscerated carcass; and a rotating brush assembly comprising at least one rotating brush having an axle and bristles fixedly attached along a length of the axle.

In another embodiment, the cleaning apparatus comprises a housing structure comprising an entrance and an exit; a cleaning solution supply in fluid communication with a tubular member disposed within the housing structure, wherein each tubular member has a plurality of spray nozzles for spraying the cleaning solution onto the exterior surfaces of the eviscerated carcass; a flood nozzle disposed within the housing structure and communicating with the cleaning fluid supply, wherein the flood nozzle has a discharge outlet directed toward an upper portion of the carcass; and a rotating brush assembly comprising at least one rotating brush having an axle and bristles fixedly attached along a length of the axle with its longitudinal axis about parallel to a general direction of movement of the eviscerated carcass through the cleaning apparatus.

The process comprises conveying the eviscerated carcass along a track through a cleaning apparatus; and simultaneously spraying the exterior surface of the carcass with a cleaning solution and brushing the exterior surface of the carcass.

The above described and other features will become better understood from the detailed description that is described in conjunction with the accompanying drawings.

BRIEF DESCRIPTION OF DRAWINGS

Referring now to the drawings, which are meant to be exemplary and not limiting, and wherein the like elements are numbered alike:

FIG. 3 shows a cross section view taken along lines 3–3 of FIG. 1.

DETAILED DESCRIPTION

Figure 1:
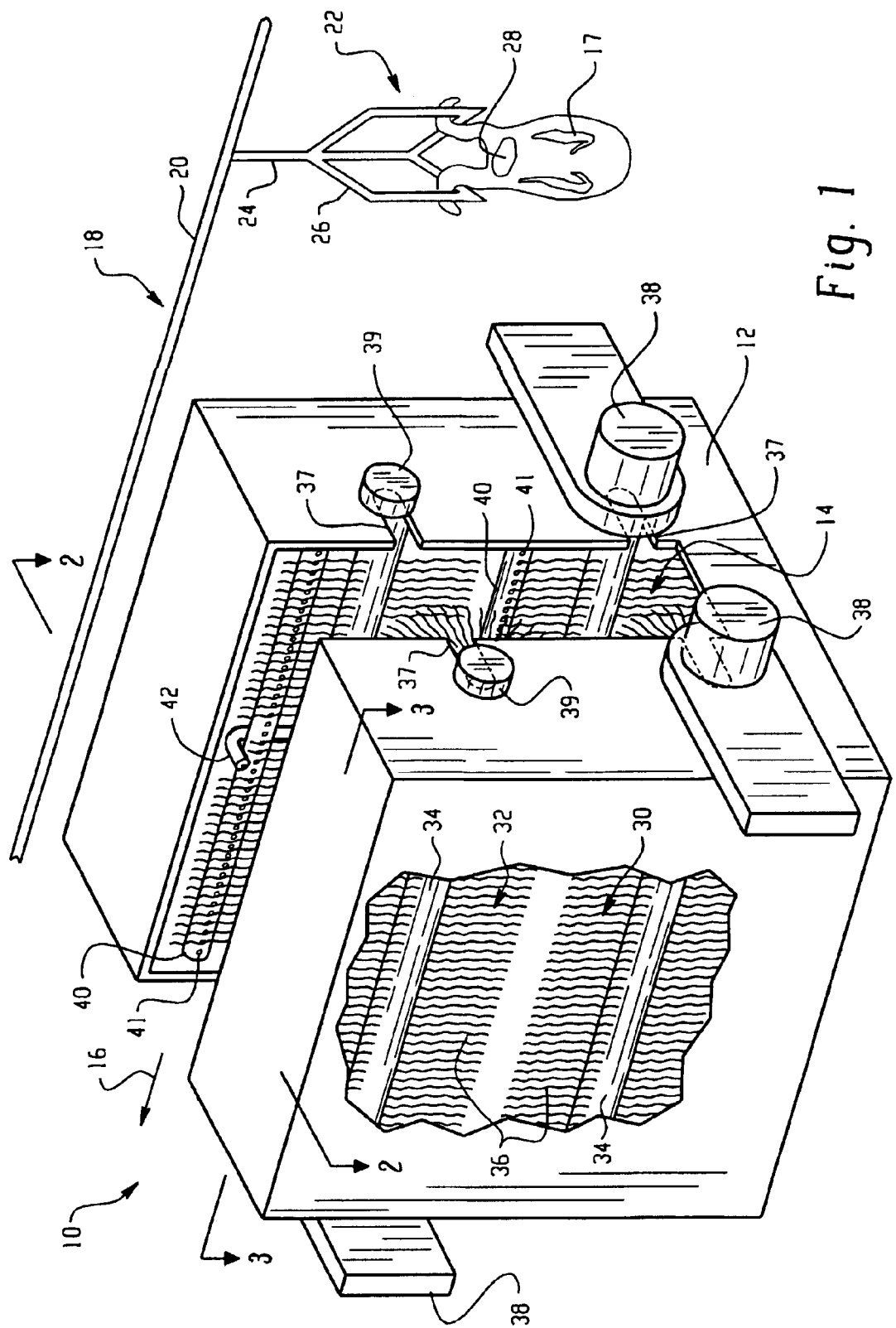
FIG. 1 shows a perspective view of the cleaning apparatus.
Figure 2:
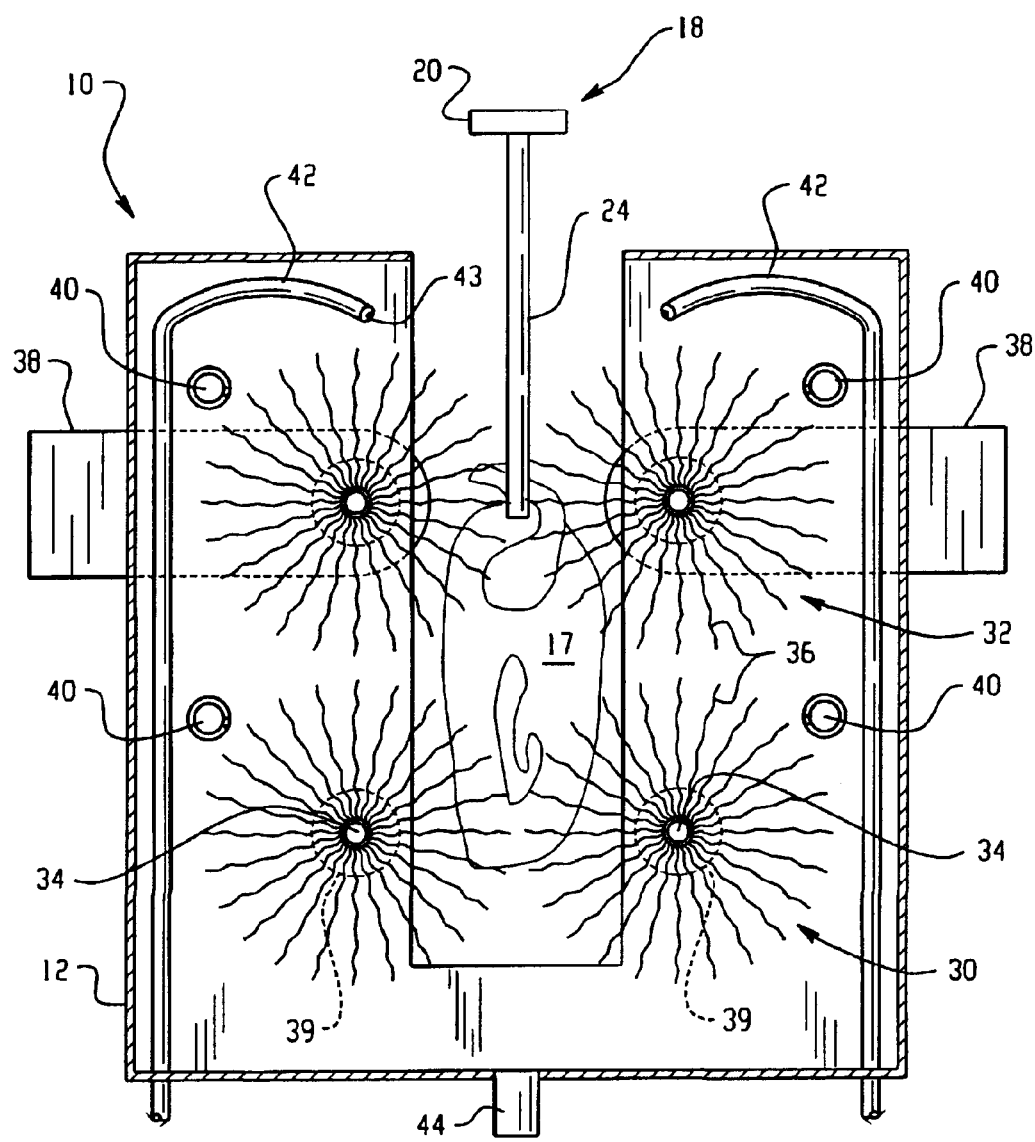
FIG. 2 shows a cross section view taken along lines 2—2 of FIG. 1.

Disclosed herein is a post evisceration process and apparatus for treating carcasses with a cleaning solution. Referring now to FIGS. 1 to 3, there is illustrated a cleaning apparatus generally designated by reference numeral 10. Preferably, the cleaning apparatus 10 is a station that is incorporated into an automated meat or poultry processing system. For exemplary purposes, the cleaning apparatus and process will now be described as it relates to processing eviscerated poultry, e.g., chicken, ducks, geese, turkeys, and the like. However, it is noted that the apparatus and process can also be employed as a station for automated processing of meat carcasses as would be apparent to those skilled in the art in view of this disclosure.

The cleaning apparatus 10 includes a housing structure 12 having an entrance 14 and an exit 16 that allows the eviscerated poultry carcass 17 to enter and exit the housing 12 by means of a conveyor 18. The housing structure 12 is preferably fabricated from an erosion resistant material, for example, stainless steel or USDA approved thermoplastics. Preferably, stainless steel is employed having a thickness gauge of about 10 to about 20. For use to treat poultry carcasses, the approximate size of the cleaning apparatus 10 is about 3 to about 5 feet in height, about 3 to about 5 feet in width and about 3 to about 5 feet in length. Larger sizes may be selected if the animal being treated is larger, e.g., cows, pigs, lambs, etc.

The conveyor 18 is an overhead track 20 that extends between each station along the processing system. Each poultry carcass 17 is hung from a yoke 22 that rides along the automated processing system. An elongated rod, referred to as a shackle bar 24, is universally connected to the yoke 22. A shackle 26 connected to the distal end of the shackle bar 24 grips the poultry carcass about the knuckle of each thigh. A drive chain (not shown) connected to each yoke 22 drives the poultry carcass along the overhead track 20. Typically, the yokes 22 are spaced apart approximately 12 inches from each other along the conveyor 18. The poultry carcasses 17 are hung from the track 20 so that the vent 28 of each carcass 17 is oriented upwardly to permit spraying of a cleaning solution or the like into the carcass cavities as well as onto the surfaces of the carcass 17 during the cleaning operation.

Rotating brush and spray assemblies are mounted within the housing structure 12. The rotating brush assembly is shown as having lower 30 and upper 32 rotating brushes, wherein each brush rotates in a direction effective to exert a downward force on the poultry carcass. That,is, as the poultry carcass enters and engages the rotating brushing assembly, the brushes disposed generally to the left of the carcass rotate clockwise whereas the brushes disposed generally to the right of the carcass rotate counterclockwise, wherein rotation direction is determined from facing the entrance 14. The lower brushes 30 are preferably opposed and coplanar to the other respective and complementary rotating brush. Likewise, the upper brushes 32 are preferably opposed and coplanar to the other respective and complementary rotating brush. Preferably, the lower or upper brushes 30 or 32 spaced from its respective and complementary rotating brush with a minimal rotational clearance such that the bristles of each rotating brush do not contact the bristles of the other rotating brush. In a similar manner, the lower brushes 30 are separated from the respective adjacent upper brushes 32 with a minimal clearance. Preferably, the minimal rotational clearance between the rotating brushes is less than about 1 inch. In this manner, the complete exterior surface of the carcass is impacted with the brush bristles during processing. The cleaning apparatus 10 may contain one or more pairs of rotating brushes depending on the application and size of the carcass.

Each individual brush 30, 32 comprises an axle 34 to which the bristles 36 are fixedly attached about the length of the axle 34. Notches 37 are formed in the housing structure 12 to support the axle 34, wherein a variable speed motor assembly. 38 is connected to one end of the axle 34 and is fixedly attached to the housing structure 12. A bearing assembly 39 is attached to the other end of the axle 34 and fixedly attached to the housing structure 12. Preferably,each rotating brush 30, 32 is in about a horizontal position within the housing structure 12 relative to the ground with its longitudinal axis about parallel to the general direction of movement of the carcass 17. More preferably, each rotating brush 30, 32 is angled at about 5 degrees to about 45 degrees relative to the ground, and even more preferably is angled at about 5 to about 30 degrees relative to the ground. The rotating brushes can be inclined, about parallel or disinclined and may be the same angle or different depending on the application. More preferably, each rotating brush 30, 32 is inclined from the entrance to the exit of the apparatus 10. In this manner, the bristles 36 of each brush 32, 34 contact the poultry carcasses in a downward and forward direction, thereby preventing line holdups and minimizing cross-contamination from contact of the poultry carcasses with adjacent carcasses. Threaded bolts and complementary threaded nuts secure the variable speed motor and bearing assembly to the housing structure 12.

The axle 34 and bristles 36 are preferably an erosion resistant material such as nylon, polyolefin, stainless steel, or the like. The shape of the bristles can be wire-liked, paddle-like, tubular, combination comprising at least one of these shapes, and other like shapes. Preferred bristles are chosen to be resilient structures for providing a brushing and massaging action upon the carcass surface during engagement.

The brushes 30, 32 have sufficient rotational speed such that particulate matter removed from the surface of the carcass is projected downward as shown more clearly in FIG. 2. Under normal operating conditions with bristles having a length of about 12 inches extending from an axle having a diameter of about 1 inch, the rotating brush is operated at about 10 to about 500 revolutions per minute (rpm), preferably about 100 to about 400 rpm, and more preferably at about 200 to about 300 rpm.

The spray assembly for ejecting liquid, fluid, vapor or other cleaning solution to the surrounding boundary environment of the carcass 17 comprises one or more tubular members 40 mounted within the housing structure 12. The tubular members 40 are preferably horizontally oriented within the housing structure 12 relative to the ground and contain a plurality of orifices 41 for spraying the cleaning solution onto the carcass. The orifices 41 are preferably formed in the tubular member 40 at an angle about perpendicular to the surface of the carcass 17 closest to the tubular member. More preferably, the spray assembly comprises one tubular member 40 for each rotating brush 30, 32 employed, wherein the tubular member 40 is oriented with its orifices 41 at an angle such that the spray discharged therefrom is directed onto the surfaces of the carcass 17 where the respective brush bristles 36 contact the carcass surface. The pressures employed for discharging the cleaning solution through the horizontally oriented tubular members 40 containing the orifices is greater than about 1 pound per square inch (psi), and preferably about 2 to about 50 psi, more preferably about 3 to about 10 and most preferably about 4 to about 7 psi.

Alternatively, the tubular members 40 contain spray nozzles (not shown), individually or in combination with the orifices, to aid in the pressurized disbursement of fluid passing through the system and provide greater control in the direction of the spray. The nozzles are constructed so that they provide the widest cone or flat spray angles and are of a wide bore design. Examples of suitable nozzles include those manufactured by spray Spray Systems, Inc.

In combination with the horizontally oriented tubular members 40, the spray assembly preferably further includes one or more tubular members 42 having a flood nozzle 43. The flood nozzle 43 is preferably a "high volume/low pressure" type nozzle that operates by delivering a high volume of between 0.5 and 1.0 gallon per second of cleaning solution at a pressure of about 5 to about 10 psi. As shown in FIG. 2, the tubular member 42 with the flood nozzle 43 is vertically oriented having its discharge outlet 43 disposed above and directed at the carcass 17. The discharge outlet 43 is preferably positioned above the carcass to provide a flooding action with the cleaning solution to insure that the vents 28 (cavities) as well as the surfaces of the poultry carcasses are treated with the cleaning solution. The pressures employed for flooding the carcasses with cleaning solution discharged from the vertically oriented tubular members 42 are greater than or equal to about 0.1 psi.

The cleaning solution may be brought in from external sources or may be contained within a pressurized container or tank mounted to the housing structure 12. The size of the tank or container is dependent on the mode of plant operation and can range in size from as little as 50 gallons to as high as 500 gallons. Again, as will be recognized by those in the art, larger sizes may be utilized for larger animals to be treated. A conduit provides fluid communication between the external source or containers and the tubular members. The housing structure 12 further includes a drain 44 disposed in a bottom surface of the housing structure 12. Cleaning solution is collected in the drain 44 and is preferably filtered and recirculated back into the container or tank.

The cleaning solution may comprise water, an antimicrobial agent, detergent, brine solution, or the like. In a preferred embodiment, the cleaning solution comprises an antimicrobial agent. Non-limiting examples of suitable antimicrobial agents include phosphates, sodium chlorite, hydrogen peroxide, ozone, periacetic acid, cetylpyridinium chloride, and sodium bisulfite, chlorous acid, hypochlorous acid, chlorine dioxide, citric acid, lactic acid sodium hypochlorite, ozonated water, combinations comprising at least one of the foregoing antimicrobials, and the like.

Preferred antimicrobial agents include a trialkali metal phosphate compound of the formula $R_3PO_4$. The trialkali phosphate solution can be prepared in accordance with the method set forth in U.S. Pat. No. 5,069,922, which is hereby incorporated by reference in its entirety. Generally, about 4 to about 12 parts of trialkali phosphate are added and mixed in with about 88 to about 96 parts of water to produce a solution that contains between about 4 to about 12% trialkali phosphate by total weight of the solution. In a preferred embodiment, the trialkali phosphate is trisodium phosphate. The phosphate solution is effective in removing, reducing, or retarding bacterial contamination.

For the purpose of adjusting the pH of the cleaning solution, minor amounts of other such agents such as sodium carbonate, sodium and/or potassium hydroxide, alkali metal polyphosphates such as tri polyphosphate or acids such as phosphoric acid may be added. Since hydroxides have an adverse effect on the organoleptic characteristics of the poultry flesh, it is preferred to avoid the use of these basic agents altogether or to use amounts that have no effect on the organoleptic characteristics. The basic agent, if used, is used in an amount insufficient to cause organoleptic deterioration. The term "minor amounts" is meant to be less than about 50% by weight of the combined dry weight of the trialkali metal phosphate and the pH-adjusting agent. The temperature of the solution is preferably maintained at between about 10° F. and about 50° F. During spraying, the cleaning solution is preferably at a temperature about 45° F. to about 55° F.

To begin the cleaning process, eviscerated birds 17 are transported along the conveyor 30, typically at the rate of about 30 to about 150 birds per minute. The conveyor 18 serially transports the poultry carcass to the cleaning apparatus 10, which cleans the birds by simultaneously brushing and spraying the cleaning solution onto the surface of the carcass. To treat the internal surfaces, and in particular the cavities of the poultry carcasses, the discharge outlet of the flood nozzle is directed into the body cavity, i.e., directed at vent 28 in the poultry carcass 17. A non-diffused stream of the cleaning solution is preferably discharged from the flood nozzle 43 and directed at the interior surfaces.

The rotating brushes 30, 32 also provide a massaging action that advantageously forces the antimicrobial agent to effectively penetrate areas traditionally difficult to clean such as the hair and feather follicles. Moreover, the simultaneous use of the brush and spray effectively removes blood clots and other debris that normally prevents contact of the cleaning solution with the underlying carcass surface. The drain 44 at the bottom of the housing structure 12 removes the cleaning solution, pathogens, particulate matter, and other debris removed from the carcasses. The solution captured by the drain 44 may then be filtered and subsequently recirculated into the cleaning apparatus 10.

The disclosure is further illustrated by the following non-limiting Examples.

EXAMPLE 1

In this example, poultry carcasses were tested for the presence of salmonella under a variety of conditions. The presence of salmonella were determined for untreated poultry carcasses, poultry carcasses sprayed with trisodium phosphate and poultry carcasses simultaneously sprayed and brushed with trisodium phosphate in the apparatus configured as shown in FIGS. 1–3. The presence of salmonella was determined in accordance with standard USDA-FSIS salmonella post chill culture testing methods. Spraying rates and conditions of the trisodium phosphate were identical for the treated poultry carcasses. Numerous poultry carcasses were tested under each condition and the results averaged. The results are shown in Table 1.

TABLE 1

|  | Average Salmonella Level (%) |
| --- | --- |
| untreated poultry | 62 |
| poultry sprayed with trisodium phosphate | 26 |
| poultry simultaneously sprayed and brushed with trisodium phosphate | 15 |

The results clearly show the improvements in the reduction of salmonella levels for poultry carcasses simultaneously sprayed and brushed with an antimicrobial agent. Surprisingly, almost a 50% improvement is obtained upon simultaneous spraying and brushing with the antimicrobial agent compared to spraying alone.

Advantageously, simultaneously brushing the exterior surfaces of the eviscerated carcass with the cleaning solution effectively removes particulate matter and provides more effective and intimate contact of the cleaning solution with the carcass. The mechanical brushing action mixes the cleaning agent with the surface fat and tissue of the eviscerated carcass. Moreover, the brushing action provides a massaging action that advantageously permits intimate and penetrating contact of the cleaning solution with the hair and feather follicles in the carcass. The process and apparatus are suitable for use in automated processing systems for preparing poultry and meat. Thus, the apparatus and process are suitable for use with large or small carcasses.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for cleaning an eviscerated carcass, the process comprising:
   conveying the eviscerated carcass along a track through a cleaning apparatus; and
   simultaneously spraying the exterior and interior surfaces of the eviscerated carcass with a cleaning solution and brushing the exterior surface of the carcass.

2. The process according to claim 1, wherein the cleaning solution comprises trisodium phosphate.

3. The process according to claim 1, further comprising directing a non-diffused or a diffused stream of the cleaning fluid at an interior surface of the eviscerated carcass.

4. The process according to claim 1, wherein brushing the exterior surface of the eviscerated carcass comprises rotating a rotating brush assembly comprising an axle and bristles fixedly attached about the axle, and contacting the bristles with the exterior surface.

5. The process according to claim 4, wherein contacting the bristles with the exterior surface comprises rotating each one of the brush assemblies in a direction to impart a downward force on the carcass from contact with the bristles.

6. The process according to claim 4, wherein rotating the rotating brush assembly comprises operating the brush assembly at about 10 to about 500 revolutions per minute.

7. The process according to claim 4, wherein contacting the bristles with the exterior surface comprises rotating each one of the brush assemblies in a direction to impart a downward and forward force on the carcass from contact with the bristles.

8. An apparatus for cleaning an eviscerated carcass, the apparatus comprising:
   a housing structure comprising an entrance and an exit;
   a conveyor for conveying the eviscerated carcass through the housing structure;
   a cleaning solution supply in fluid communication with a tubular member mounted within the housing structure, wherein each tubular member has a plurality of outlet orifices for spraying the cleaning solution onto the exterior surfaces of the eviscerated carcass; and a rotating brush assembly comprising at least one rotating brush having an axle and bristles fixedly attached along a length of the axle, wherein the at least one rotating brush is in about a horizontal position within the housing structure relative to the ground with its longitudinal axis inclined to a general direction of movement of the eviscerated carcass through the cleaning apparatus.

9. The apparatus according to claim 8, wherein the tubular member is in a horizontal position within the housing structure relative to the ground.

10. The apparatus according to claim 8, wherein each rotating brush is in about a horizontal position within the housing structure relative to the ground with its longitudinal axis about parallel to a general direction of movement of the eviscerated carcass through the cleaning apparatus.

11. The apparatus according to claim 8, wherein the longitudinal axis is inclined from the entrance to the exit at an angle of about 5 degrees to about 45 degrees relative to the ground.

12. The apparatus according to claim 8, wherein the bristles comprise a shape selected from the group consisting of tubes, wires, paddles, and combinations comprising at least one of the foregoing shapes.

13. The apparatus according to claim 8, wherein the bristles comprise a material selected from the group consisting of nylon, polyolefin, steel, stainless steel, and combinations comprising at least one of the foregoing materials.

14. An apparatus for cleaning an eviscerated carcass, the apparatus comprising:
   a housing structure comprising an entrance and an exit;
   a cleaning solution supply in fluid communication with a tubular member disposed within the housing structure, wherein each tubular member has a plurality of spray nozzles for spraying the cleaning solution onto the exterior surfaces of the eviscerated carcass;
   a flood nozzle disposed within the housing structure and communicating with the cleaning fluid supply, wherein the flood nozzle has a discharge outlet directed toward an upper portion of the carcass; and
   a rotating brush assembly comprising at least one rotating brush having an axle and bristles fixedly attached along a length of the axle with its longitudinal axis parallel to a general direction of movement of the eviscerated carcass through the cleaning apparatus.

15. The apparatus according to claim 14, wherein the at least one rotating brush is in about a horizontal position within the housing structure relative to the ground with its longitudinal axis inclined to a general direction of movement of the eviscerated carcass through the cleaning apparatus.

16. The apparatus according to claim 15, wherein the longitudinal axis is inclined from the entrance to the exit at an angle of about 5 degrees to about 45 degrees relative to the ground.

* * * * *